United States Patent
Toba

(10) Patent No.: US 6,578,125 B2
(45) Date of Patent: Jun. 10, 2003

(54) MEMORY ACCESS CIRCUIT AND MEMORY ACCESS CONTROL CIRCUIT

(75) Inventor: Akira Toba, Osaka (JP)

(73) Assignee: Sanyo Electric Co., Ltd., Moriguchi (JP)

(*) Notice: Subject to any disclaimer, the term of this patent is extended or adjusted under 35 U.S.C. 154(b) by 98 days.

(21) Appl. No.: 09/780,424

(22) Filed: Feb. 12, 2001

(65) Prior Publication Data

US 2001/0014934 A1 Aug. 16, 2001

(30) Foreign Application Priority Data

Feb. 14, 2000 (JP) .......................................... 2000-035058
May 10, 2000 (JP) .......................................... 2000-137508

(51) Int. Cl.$^7$ .............................................. G06F 12/00
(52) U.S. Cl. .................... 711/167; 711/111; 711/112; 711/115; 711/172
(58) Field of Search ................................ 711/112, 170, 711/171, 172, 167, 111, 115; 710/57

(56) References Cited

U.S. PATENT DOCUMENTS 5,291,468 A * 3/1994 Carmon et al. .......... 369/47.33

* cited by examiner

Primary Examiner—Reginald G. Bragdon
Assistant Examiner—Midys Inoa
(74) Attorney, Agent, or Firm—Armstrong, Westerman & Hattori, LLP

(57) ABSTRACT

A memory access circuit includes a memory and a slot for receiving therein a memory card having a controller. Address, CS (chip select) and We (output enable) signals different in active period from one another are supplied to the controller. Due to this, ID data signals are read from the memory. The CPU determines for properness on the read-out ID data signals. Specifically, when the common data contained in the ID data signal exhibits a predetermined value, the ID data signal is determined proper. However, when the common data does not exhibit the predetermined value, the ID data signal is determined improper. The CPU determines as an optimal active period a shortest active period among the active periods that proper ID data signals have been read out.

3 Claims, 10 Drawing Sheets

MEMORY ACCESS CIRCUIT AND MEMORY ACCESS CONTROL CIRCUIT

BACKGROUND OF THE INVENTION

1. Field of the Invention

This invention relates to a memory access circuit or memory access control circuit and, more particularly, to a memory access circuit or memory access control circuit for enabling access through a controller provided on an unloadable recording medium to a memory in the same recording medium.

2. Description of the Prior Art

The recording mediums, to be removably received in electronic appliances, include those such as compact flashes accessible to the semiconductor memory through the controller provided on the medium. Herein, there is a tendency that the access rate of the controller increases with the increase in memory capacity. That is, as the semiconductor memory capacity is increased by the advancement of technology, the access rate of the controller also increases owing to the technological advancement. In the prior art, however, the access control signal for the controller has an active period having been set comparatively long in order to enable positive access even where a small-capacity recording medium is inserted. Thus, it has been impossible for the controller to exhibit its capacity to a full extent.

SUMMARY OF THE INVENTION

Therefore, it is a primary object of the present invention to provide a memory access circuit or memory access control circuit by which a controller provided on a recording medium can exhibit its capacity to a full extent.

A memory access circuit according to the present invention comprises: a holder for holding a removable recording medium having a memory and a controller to access the memory in response to an access control signal; an outputter for outputting the access control signal to the controller; a detector for detecting a capacity value of the memory; first setter for setting an active period for the access control signal to a first period when the capacity value is below a predetermined threshold; and a second setter for setting an active period for the access control signal to a second period shorter than the first period when the capacity value is greater than the predetermined threshold.

The recording medium to be held by the holder is a removable recording medium having a controller for access to a memory in response to an access control signal and a memory. The capacity value of the memory is detected by the detector. A detected capacity value is compared with a predetermined threshold by the comparator. When the capacity value is below the predetermined threshold, the active period for the access control signal to be outputted to the controller by the outputter is set to a first period by the first setter. Contrary to this, when the capacity value is greater than the predetermined threshold, the active period for the access control signal is set to a second period shorter than the first period by the second setter.

That is, it is considered that the controller can realize access at higher speed as the capacity of the memory increases. Thus, when the capacity value is greater than the predetermined threshold, the active period for the access control signal is made short. Consequently, it is possible for the controller provided on the recording medium to exhibit to a maximum extent.

Preferably, the memory stores capacity value data, and the detector detecting the capacity value by reading the capacity value data from the memory according to the access control signal.

Also, the access control signal preferably contains an enable signal, the enable signal having an active period set to either one of the first period or the second period.

A memory access control circuit, comprises: a holder for removably holding a recording medium having a memory storing a data signal and a controller to read the data signal from the memory in response to a read control signal; an outputter for outputting to the controller a plurality of read control signals different in active period from one another; determiner for determining whether each of the plurality of data signals read in response to the plurality of read control signals is proper in data value or not; and an enabler for enabling a shortest active period among the active periods corresponding to determination results that the data value is proper.

The recording medium to be removably held by the holder has a memory and a controller to read a data signal from the memory in response to a read control signal. The outputter outputs to the controller a plurality of read control signals different in active period from one another. When a plurality of data signals are read from the memory in response to the read control signals, the determiner determines whether each of read-out data signals is proper in data value or not. The first enabler enables a shortest active period among the active periods corresponding to determination results that the data value is proper.

In this manner, determination is made as to properness in data value on the data signals read out by the read control signals different in active period from one another. Activation is made for the shortest active period among the active periods corresponding to the determination results as proper. Accordingly, the controller is allowed to exhibit its performance to a maximum extent.

In one aspect of this invention, the memory stores a common data signal that is common to respective ones of the recording medium, each of the plurality of read control signals including storage-destination address information for the common data signal, and the determiner determining whether the common data signal read from the memory exhibits a predetermined value or not.

In another aspect of this invention, a capacity value of the memory is detected by detector, and the outputter is enabled by the enabler when the capacity value exceeds a predetermined threshold.

Preferably, the memory stores a capacity value data signal representative of the capacity value, and the detector detecting the capacity value by reading the capacity value data signal.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
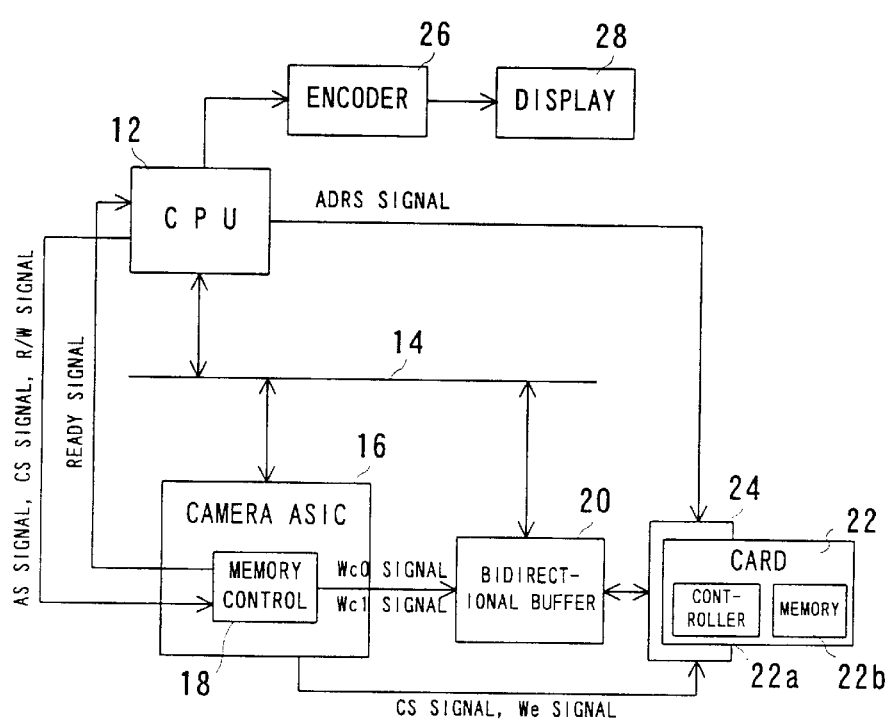
FIG. 1 is a block diagram showing an embodiment of the present invention.

Referring to FIG. 1, an image reproducing apparatus 10 of this embodiment includes a CPU 12 of a synchronous bus scheme. The CPU 12 is connected, through a data bus 14, with a camera ASIC 16 and a bi-directional buffer 20. Meanwhile, a memory card 22 when received in a slot 24 is put into connection to the bi-directional buffer 20. The memory card 22 has a controller 22a and a memory 22b, so that the controller 22a is connected to the bi-directional buffer 20. Consequently, access to the memory 22b is through the controller 22a. Note that the memory card 22 is a removable recording medium, such as a compact flash, compatible with the PCMCIA format.

When reading data from the memory card 22, the CPU 12 outputs an address strobe signal (AS signal), a chip select signal (CS signal), an R/W signal for identifying an access content and an address signal (ADRS signal). Among these, the AS signal, CS signal and R/W signal is supplied to a memory control circuit 18 provided in the camera ASIC 16 while the ADRS signal is given to the memory card 22. In response to an input signal, the memory control circuit 18 supplies a control signal (Wc0 signal, Wc1 signal) to the bi-directional buffer 20, and further CS signal and output enable signal (We signal) to the memory card 22. Due to this, data is read from a desired address of the memory 22b. The read-out data is outputted onto the bi-directional buffer 20 and, through the bus 14, to the CPU 12.

Where the read data is image data, the CPU 12 provides this image data to a display 28 through an encoder 26. As a result, a reproduced image is displayed on the screen of the display 28.

The data to be read from the memory 22b includes, besides image data, capacity value data representative of a capacity value of the memory 22b. The CPU 12, prior to reading out image data, reads out capacity value data. According to a value of the read capacity data, the CPU 12 switches its own access processing period and an access processing period for the memory control circuit 18. That is, if the memory 22b is in large capacity, the access processing period is shortened while, if the memory 22b is in small capacity, the access processing period is increased.

Figure 2:
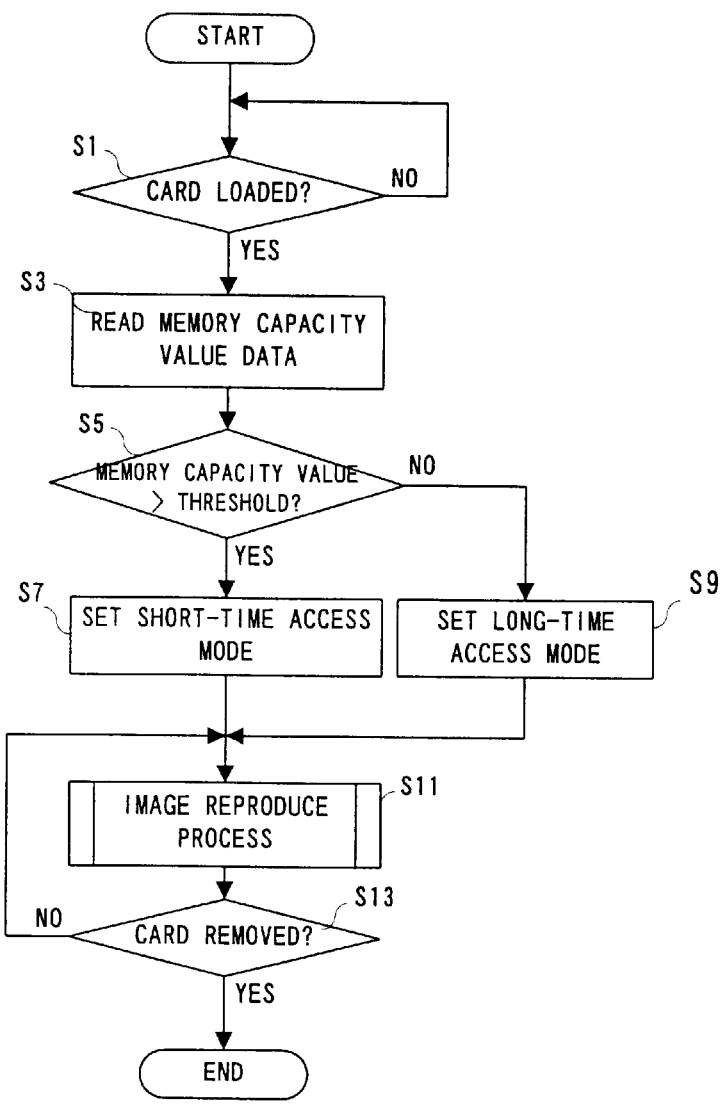
FIG. 2 is a flowchart showing a part of operation in the FIG. 1 embodiment.

The CPU 12 concretely processes a flowchart shown in FIG. 2. First, it is determined in step S1 whether a memory card 22 is inserted in the slot 24 or not. When a result of determination is "YES", in step S3 the capacity value data of the memory 22b is read from the memory card 22. After reading out a capacity value data, in step S5 the capacity value represented by the capacity value data is compared with a predetermined threshold. If the capacity value is in excess of the threshold, in step S7 a short-time access mode is set to itself and to the memory control circuit 18. If the capacity value is below the threshold, in step S9 a long-time access mode is set to itself and the memory control circuit 18. After completing the mode setting, in step S11 an image-data reproducing process is executed. At this time, image data is read from the memory card 22 according to the mode as established in the step S7 or S9. The CPU 12 advances to step S13 each time the reproducing process completes once, to thereby determine whether the memory card 22 has been removed from the slot 26 or not. If "NO", the process returns to the step S11. However, if "YES", the process is ended.

In this manner, the access-mode set process is made upon inserting the memory card 22. The access mode is not again established unless the memory card 22 is removed.

Figure 3:
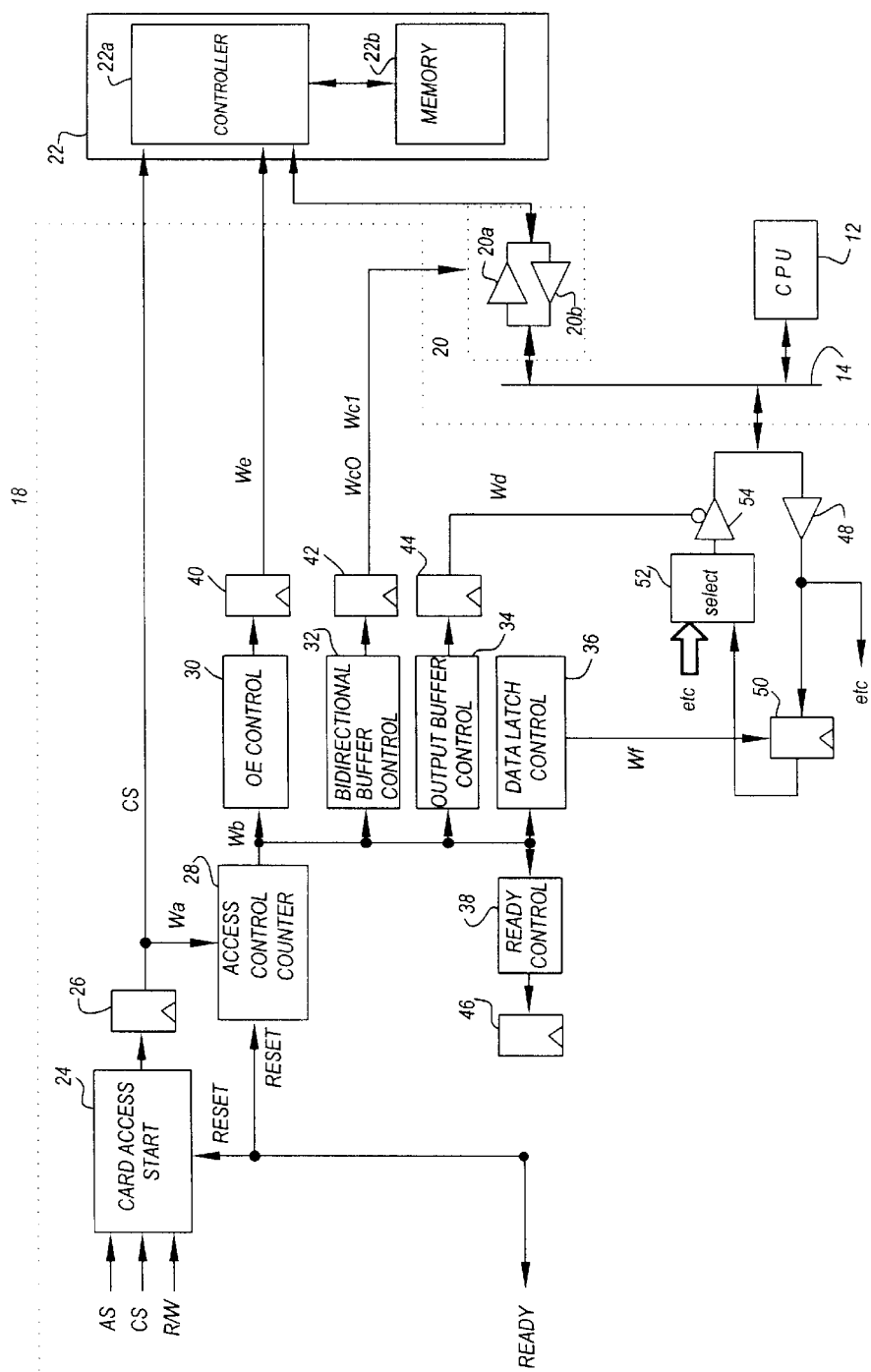
FIG. 3 is a block diagram showing a memory control circuit provided in the FIG. 1 embodiment.
Figure 4:
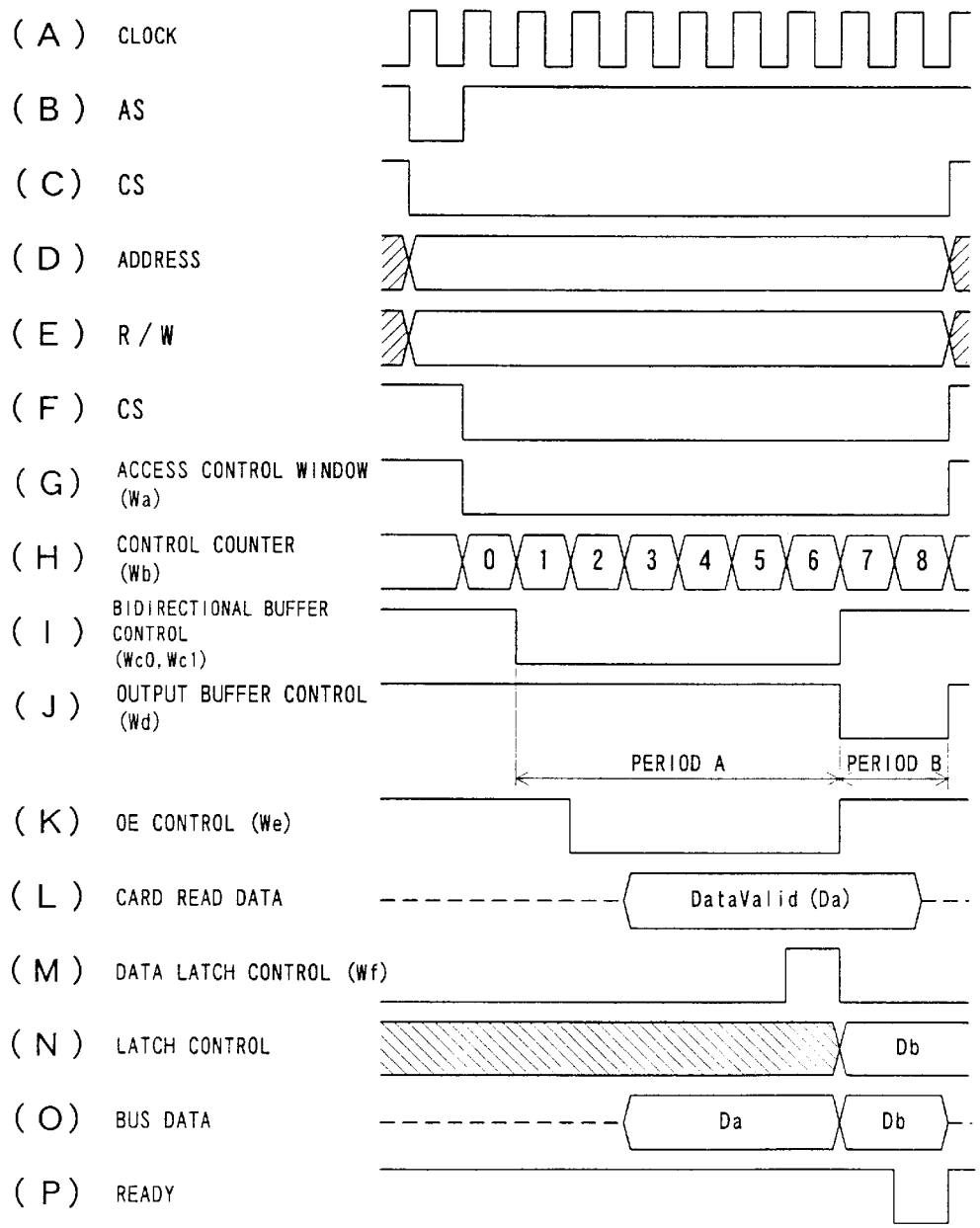
FIG. 4 is a timing chart showing a part of operation in the FIG. 1 embodiment.

The memory control circuit 18, in concrete, is configured as shown in FIG. 3. Meanwhile, when reading capacity value data from the memory card 22 or when image data is read from the memory card 22 in the long-time access mode, the CPU 12 and the memory control circuit 18 operate in timing as shown in FIG. 4.

The AS, CS, ADRS and R/W signals are outputted from the CPU 12, in timing as shown in FIG. 4(B) to FIG. 4(E). Both the AS signal and the CS signal are active-low signals. An access start circuit 24 receives R/W, AS and CS signals and outputs a CS signal shown in FIG. 4(F) and an access control window signal (Wa signal) shown in FIG. 4(G). The CS and Wa signals are also active-low signals, which are synchronized with a clock as shown in FIG. 4(A) by a latch circuit 26. The CS signal is provided to the controller 22a, while the Wa signal is to a counter 28 for access control. This makes active the controller 22a and counter 28. Incidentally, the destination address of reading the memory 22b is specified by an ADRS signal directly given from the CPU 12.

The count value (Wb signal) of the counter 28 is incremented responsive to the clock as shown in FIG. 4(H). The count value like this is provided to an OE control circuit 30, a bi-directional buffer control circuit 32, an output buffer control circuit 34, a data latch control circuit 36 and a READY control circuit 38. The OE control circuit 30 generates an output enable signal (We signal) when the count value takes "1"–"5". The We signal is outputted through the latch circuit 40, in timing as shown in FIG. 4(K). Also, the bi-directional buffer control circuit 32 generates control signals (Wc0 signal, Wc1 signal) when the count value takes "0"–"5". These control signals are outputted, through the latch circuit 42, in timing as shown in FIG. 4(I). Furthermore, the output buffer control circuit generates a control signal (Wd signal) when the count value takes "6"–"7". This Wd signal is outputted in timing as shown in FIG. 4(J). Furthermore, the data latch control circuit 36, when the count value takes "6", generates a control signal (Wf signal) as shown in FIG. 4(M). Also, the READY control circuit 38 generates a ready signal when the count value takes "7". The READY signal is outputted, through the latch circuit 46, in timing as shown in FIG. 4(P).

That is, the Wc0 signal, the Wc1 signal, the Wd signal, the We signal and the READY signal as active low signals are delayed by in the latch circuits 40–46. On the other hand, the active-high Wf signal is outputted as it is without delay.

The We signal outputted from the latch circuit 40 is provided to the controller 22a. As described above, because the We signal is an active-low output enable signal, the controller 22a in a period that signal assumes a low level reads data from the memory 22b. The data is held in an extremely short period even after a rise in the We signal, and data reading timing is expressed as shown in FIG. 4(L). On the other hand, the Wc0 and Wc1 signals outputted from the latch circuit 42 are provided to the bi-directional buffer 20. The bi-directional buffer 20 is powered on by the Wc0 signal. The buffer 20a is disabled and the buffer 20b is enabled by the Wc1 signal. Consequently, only in the period A shown in FIG. 4, data transfer is possible from the memory card 22 toward the data bus 14. As a result, the read data (data Da) is passed through the bi-directional buffer 20 and data bus 14 and inputted to the memory control circuit 18, in timing as shown in FIG. 4(O).

The data Da is passed through the buffer 48 and supplied to the latch circuit 50 where it is latched by a rise of the clock in a period the Wf signal outputted from the data latch control circuit 36 is in rise. That is, the data Da is latched at a time that the count value becomes "7". Provided that the latch data is Db, the data Db is outputted from the latch circuit 50 in timing shown in FIG. 4(N), and inputted to the buffer 54 through a select circuit 52. The buffer 54 is enabled in a period B shown in FIG. 4 by a Wd signal outputted from the latch circuit 44, and outputs data Db on to the data bus 14 only in the period B. As a result, the data transferred over the data bus 14 is switched from Da into Db, in timing shown in FIG. 4(O).

From the latch circuit 46, a READY signal is outputted when the count value becomes "8". The READY signal is supplied to the access start circuit 24 and the counter 28, besides to the CPU 12. The access start circuit 24 is disabled at a rise in the READY signal. This suspends the CS and Wa signals from outputting. Also, the counter 28 is reset at a rise in the READY signal. As a result, controller 22a is disabled two clocks after the data Da has been latched. On the other hand, the CPU fetches the data Db at a rise in the clock during an input period of the READY signal, and suspends the AS, CS, R/W and ADRS signals from being outputted at a rise in the READY signal.

Figure 5:
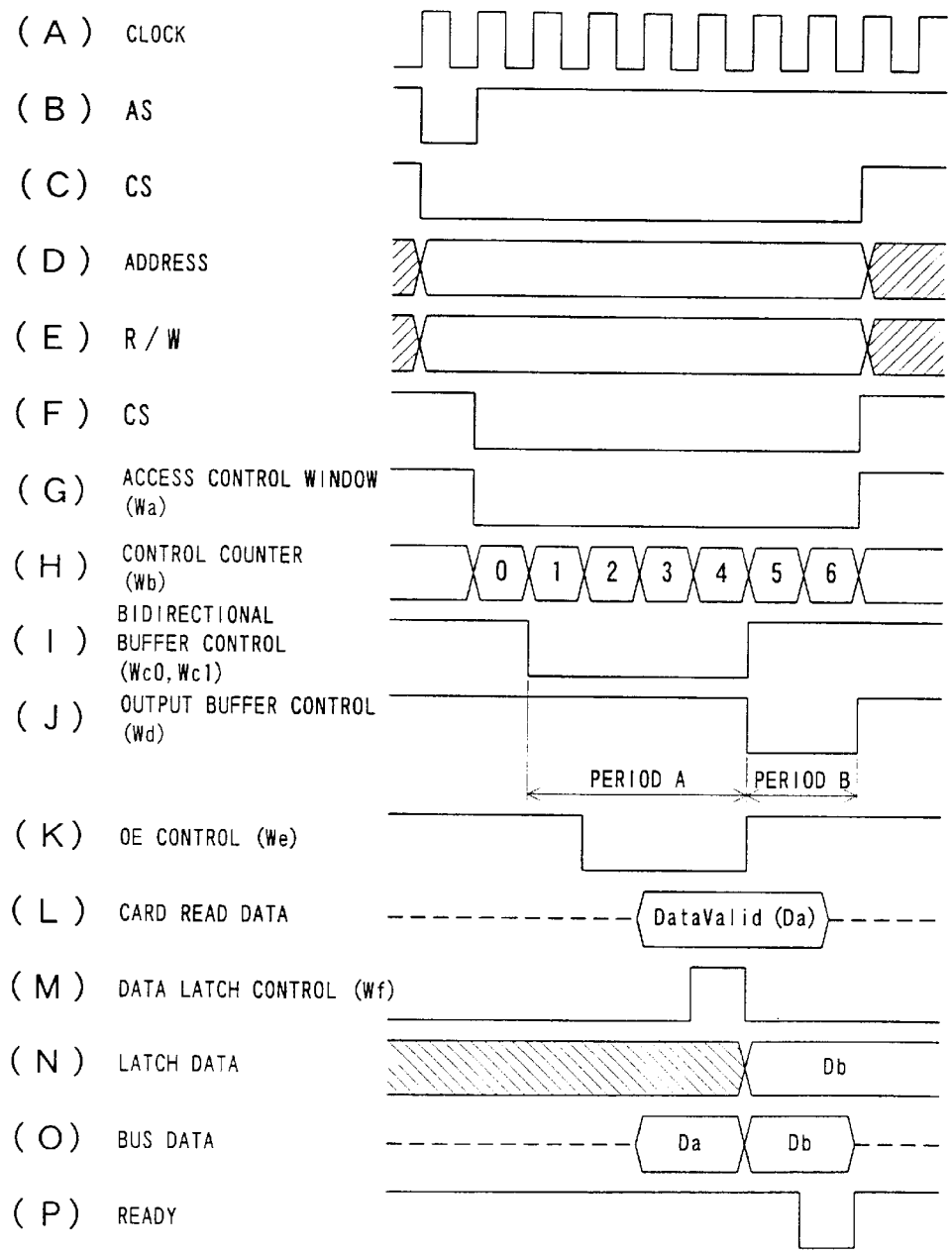
FIG. 5 is a timing chart showing another part of operation in the FIG. 1 embodiment.

In the short-time access mode, when image data is read out of the memory card 22, the CPU 12 and the memory control circuit 18 operate in timing as shown in FIG. 5.

The AS, CS, ADRS and R/W signals are outputted from the CPU 12 in timing as shown in FIG. 5(B) to FIG. 5(E). The access start circuit 24 outputs a CS signal shown in FIG. 5(F) and an access control window signal (Wa signal) shown in FIG. 5(G), in response to a rise in the AS signal. The output CS and Wa signals are latched in the latch circuit 26. The CS signal is supplied to the controller 22 while the Wa signal to the counter 28.

The count value (Wb signal) of the counter 28 is incremented responsive to the clock as shown in FIG. 5(H). The OE control circuit 30 generates an output enable signal (We signal) when the counter 28 takes a count value of "1"–"3". The We signal is outputted through the latch circuit 40 in timing as shown in FIG. 5(K). Also, the bi-directional buffer control circuit 32 generates a control signal (Wc0 signal, Wc1 signal) when the count value takes "0"–"3". These signals are also outputted through the latch circuit 42, in timing as shown in FIG. 5(I). Furthermore, the output buffer control circuit 34 generates a control signal (Wd signal) when the count value takes "4"–"5". This Wd signal is also outputted in timing as shown in FIG. 5(J). Furthermore, the data latch control circuit 36 generates a control signal (Wf signal) shown in FIG. 5(M) when the count value takes "4". The READY control circuit 38 generates a READY signal and the count value takes "5". This READY signal is outputted through the latch circuit 46 in timing as shown in FIG. 5(P). The We signal outputted from the latch circuit 40 is supplied to the controller 22a so that the controller 22a reads data from the memory 22b in a period the We signal takes a low level. The data is held in a slight period even after a rise in the We signal, wherein the timing of reading out the data is as shown in FIG. 5(L). Meanwhile, the Wc0 and Wc1 signals outputted from the latch circuit 42 are supplied to the bi-directional buffer 20 so that data transfer is made possible from the memory card 22 toward the data bus 14 only in a period A shown in FIG. 5. Consequently, the data read out of the memory 22b (data Da) is inputted to the memory control circuit 18 through the bi-directional buffer 20 and data bus 14, in timing as shown in FIG. 5(O).

The data Da is supplied to the latch circuit 50 through the buffer 48, where it is latched at a rise of the clock during a period the Wf signal outputted from the data latch control circuit 36 rises. That is, the data Da is latched at a time point that the count value becomes "5". The latch data Db is outputted from the latch circuit in timing shown in FIG. 5(N) and inputted to the buffer through the select circuit 52. The buffer 54 is enabled in the period shown in FIG. 5 by the Wd signal outputted from the latch circuit 44, and outputs data Db onto the data bus 14 only in this period B. As a result, the data transferred over the data bus 14 is switched from Da to Db in timing shown in FIG. 5(O).

When the count value reaches "6", a READY signal is outputted from the latch circuit 46 and supplied to the CPU 12, the access start circuit 24 and the counter 28. The access start circuit 24 suspends CS and Wa signals from outputting at a rise in the READY signal. The counter 28 is reset at the, rise in the READY signal. On the other hand, the CPU 12 fetches the data Db in the clock rise during the period of inputting the READY signal, and suspends the AS, CS, R/W and ADRS signals from being outputted at the rise in the READY signal.

As can be understood from FIG. 4 and FIG. 5, the various access control signals outputted from the CPU 12 and memory control circuit 18 have active periods shorter in the brief-time access mode than in the long-time access mode. The brief-time access mode herein is established when the capacity of the memory 22b is greater than a predetermined threshold. This is due to the consideration that the greater the capacity value of the memory 22b the higher the performance of the controller 22a becomes wherein the controller 22a can positively access a desired address even if the active period of the access control signal is brief. As a result, the controller 22a is allowed to exhibit its performance to a maximum extent, and access is at a higher speed as the capacity of the memory 22b is increased.

Figure 6:
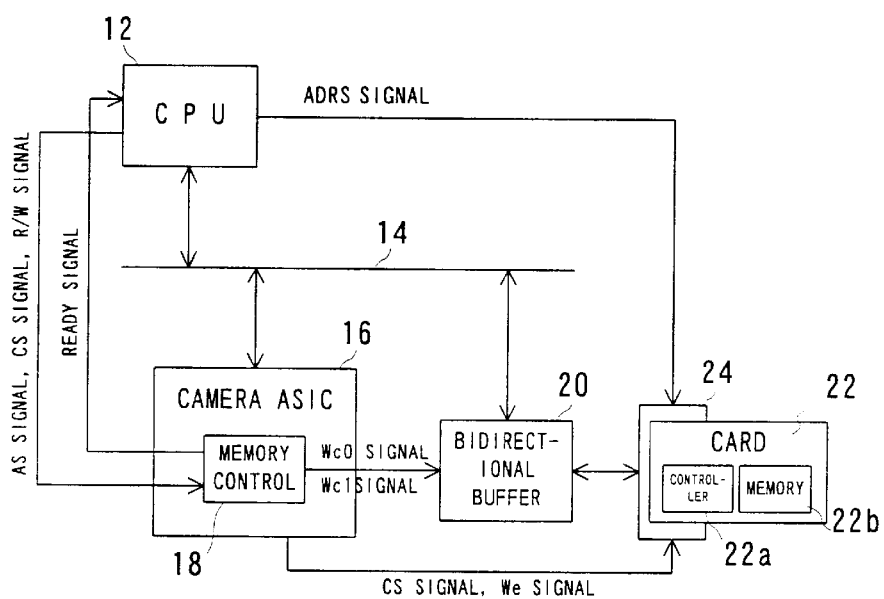
FIG. 6 is a block diagram showing another embodiment of the present invention.

Referring to FIG. 6, another embodiment of a data processing apparatus 10 is configured similar to the image reproducing apparatus 10 shown in FIG. 1, except in that the encoder 26 and display 28 is omitted. Hence, duplicated explanation on the similar portions will be omitted.

When reading data out of the memory card 22, the CPU 12 outputs AS, CS, R/W and ADRS signals. Among these, the AS, CS and R/W signals are supplied to the memory control circuit 18 provided in the camera ASIC 16 while the ADRS signal is to the memory card 22. The memory control circuit 18, in response to the input signals, delivers Wc0 and Wc1 signals to the bi-directional buffer 20 and further CS and We signals to the memory card 22. Due to this, a data signal is read from a desired address of the memory 22b and the read data signal is outputted to the CPU 12 through the bi-directional buffer 20 and bus 14. The camera ASIC 16 outputs, by itself, a READY signal to the CPU 12 in timing the data signal is supplied to the CPU 12.

Figure 7:
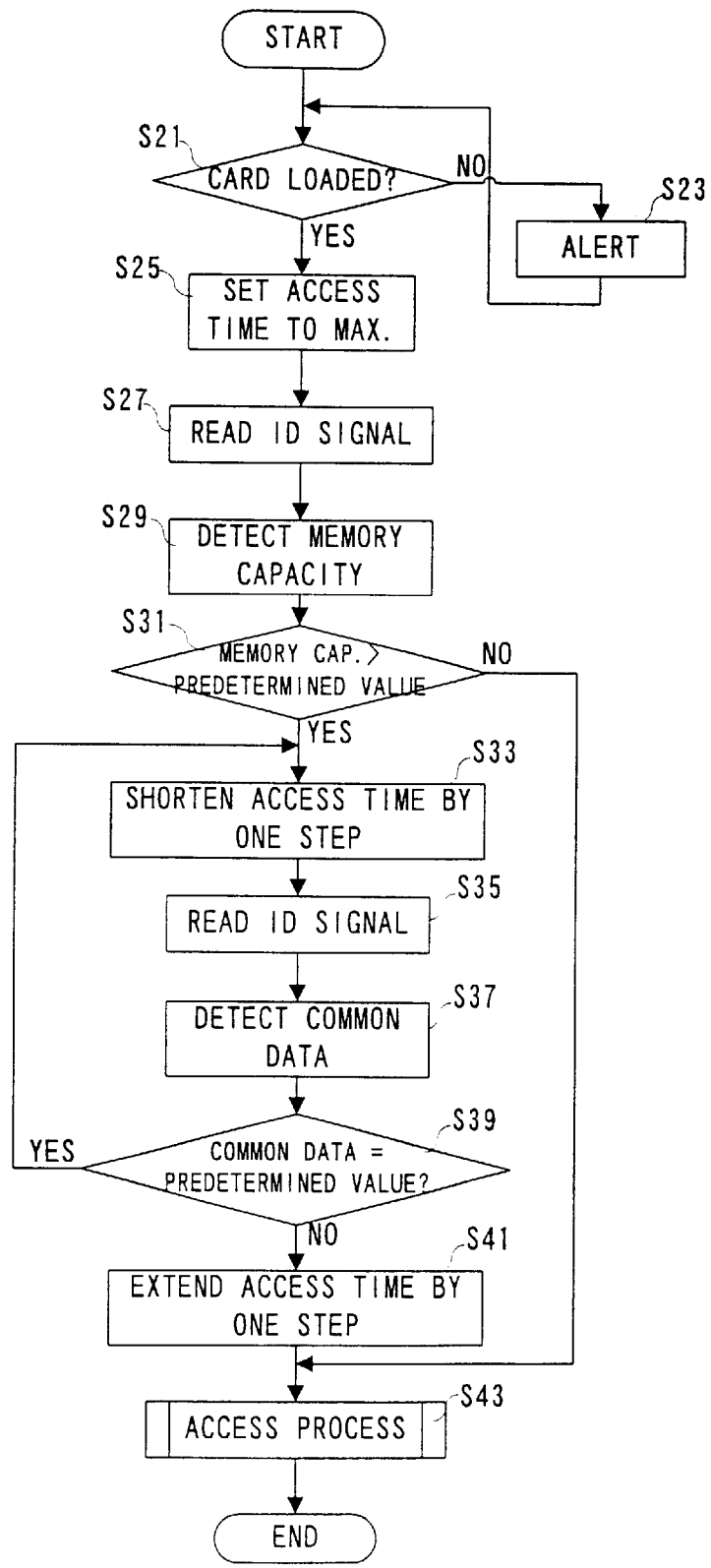
FIG. 7 is a flowchart showing a part of operation in the FIG. 6 embodiment.

The CPU 12 concretely processes a flowchart shown in FIG. 7. First, it is determined in step S21 whether the memory card 22 is inserted in the slot 24 or not. If not inserted, in step S23 an alert is generated. On the other hand, if the memory card 22 is received, in step S25 the access time is set to a maximum value. Specifically, the active periods of the CS, R/W and ADRS signals to be outputted, by itself, are set to maximum values, and further a control signal is provided to the camera ASIC 16 to set the active periods of the Wc0, Wc1, CS and We signals to maximum values.

In step S27, AS and CS signals and an R/W signal representative of "reading out" are supplied to the camera ASIC 16, and further an ADRS signal representative of a storage address of an ID data signal is given to the memory card 22. The controller 22a provided on the memory card 22 is supplied with the CS, We and ADRS signals set with the active periods at maxim values. Due to this, an ID data signal is read from the ID storage address of the memory 22b. In step S29, a capacity value of the memory 22b is detected from the read ID data signal. That is, the ID data signal has common data, such as type number, that is common to any memory card and capacity value data representative of a capacity value. In the step S29, a capacity value data is detected from the ID data signal.

In step S31, it is determined based on detected capacity value data whether the capacity value of the memory 22b is greater than a predetermined value (e.g. 8 M bytes) or not. If the capacity value ≦ the predetermined value, the process directly enters an access process to a desired data signal of step S43. That is, by the determination of "NO" in the step S31, the maximum active period (maximum access time) is determined as an optimal active period (optimal access time). As a result, in the step S43 the memory card 22 is given the CS, We and ADRS signals assuming the maximums in the active periods whereby an access process is made with the maximum access time.

On the other hand, if determined the capacity value > the predetermined value in step S31, then in step S33 the access time is reduced by one step. That is, the active periods of the CS, R/W and ADRS signals to be outputted by itself and the active periods of the Wc0, Wc1, CS and We signals to be outputted from the memory control circuit 18 are set to periods shorter by one step than those in the present time. In step S35, the memory card 22 is accessed with various signals set again with active periods in a manner similar to the step S27, to read an ID data signal out of the memory 22b.

In step S37, common data is detected from the read ID data signal. In the succeeding step S39, a detected common data value is compared with a predetermined value, to determine whether the ID data signal is proper or not. If the common data value herein represents a predetermined value, the ID data signal is considered having been properly read out (considered the ID data signal as proper) and the process returns to the step S33. As a result of returning to the step 533, the access time is reduced further by one step, and an ID data signal is again read out with a reduced access time.

If an ID data signal is not properly read out because of shortening the access time and a common-data value shows a different value form the predetermined value, then "NO" is determined (the read ID data signal is improper) in step S39. In this case, the access time is increased by one step in step S41. That is, the active periods of CS, RIW and ADRS signals to be outputted by the own and the active periods of Wc0, Wc1, CS and We signals to be outputted from the memory control circuit 18 are set to the shortest periods for properly reading out an ID data signal. This makes it possible to determine, as an optimal active period, a shortest active period for properly reading out an ID data signal. After determining the optimal active period, in step S43 an access process to a desired data signal is executed.

Figure 8:
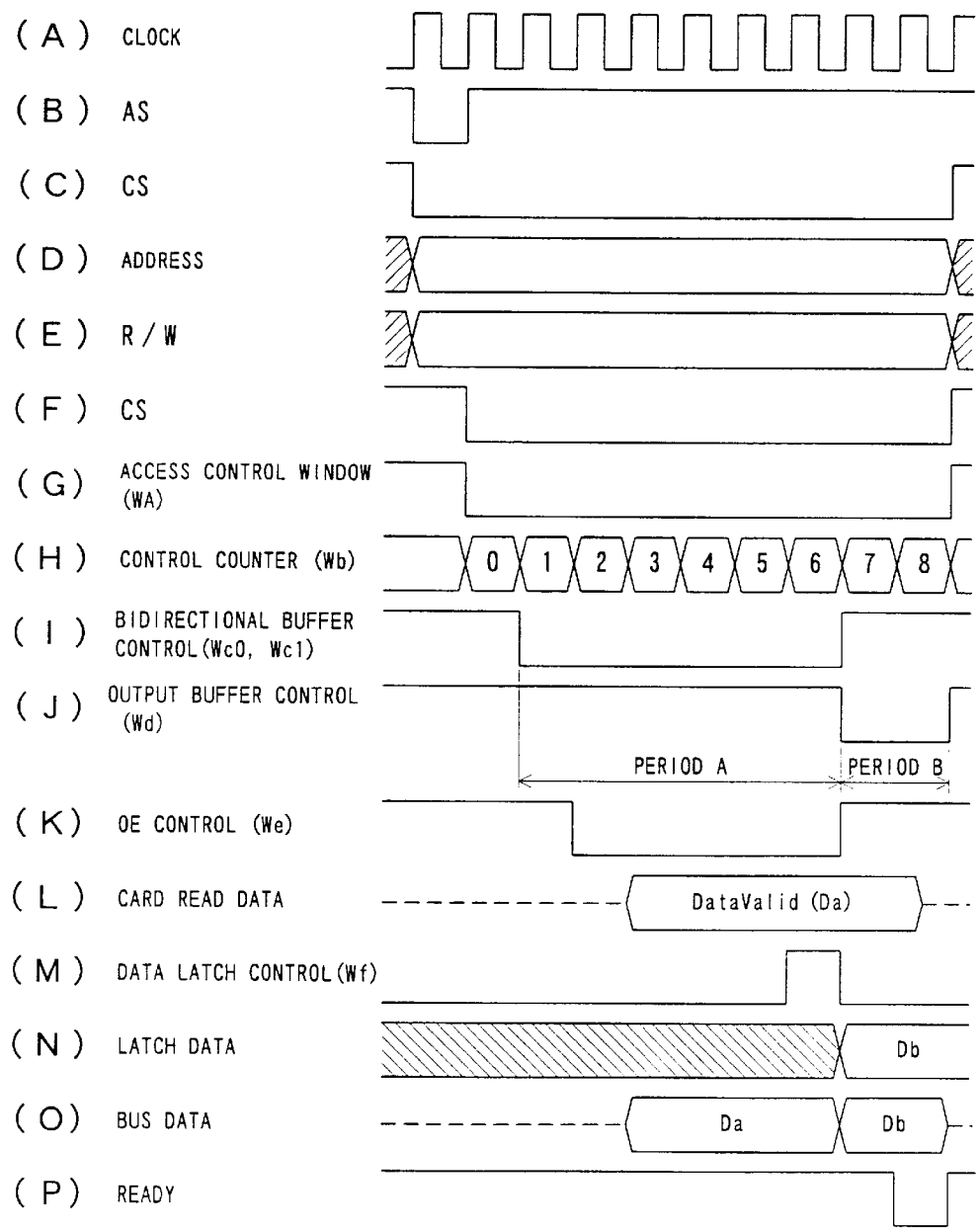
FIG. 8 is a timing chart showing one part of operation in the FIG. 6 embodiment.
Figure 9:
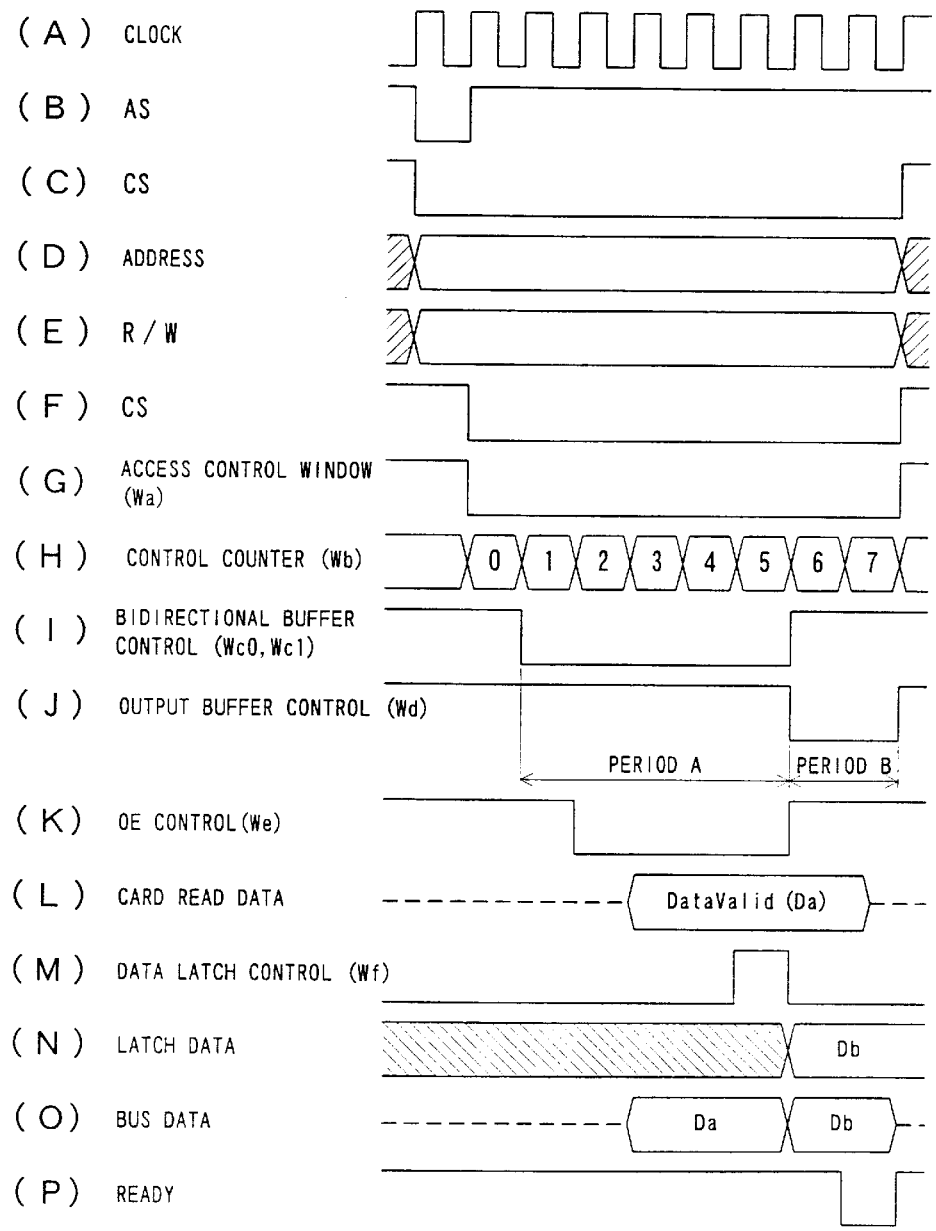
FIG. 9 is a timing chart showing another part of operation in the FIG. 6 embodiment.
Figure 10:
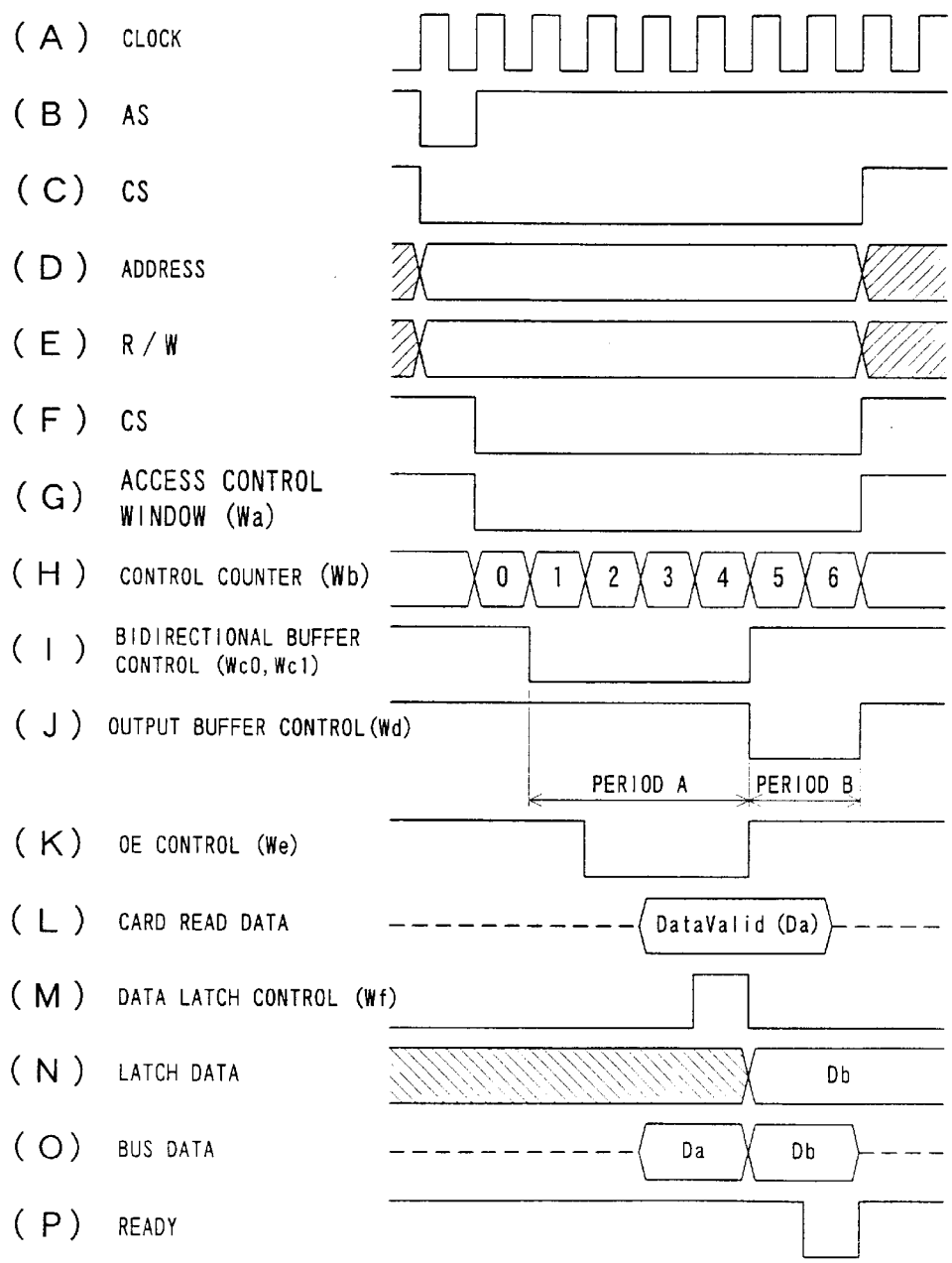
FIG. 10 is a timing chart showing another part of operation in the FIG. 6 embodiment.

The memory control circuit 18 is configured similarly to that of the first embodiment (i.e., as shown in FIG. 3). When reading an ID data signal from the memory card 122 by spending a maximum access time, the CPU 12 and the memory control circuit 18 operate in timing as shown in FIG. 8. Also, when the access time is reduced by one step, the CPU 12 and the memory control circuit 18 operate in timing as shown in FIG. 9. When the access time is further reduced by one step, the CPU 12 and the memory control circuit 18 operate in timing as shown in FIG. 10. Incidentally, the timing charts shown in FIG. 8 to FIG. 10 are almost similar to the timing charts shown in FIG. 4 and FIG. 5, hence omitting concrete explanation.

According to FIG. 8(H), the Wb signal (count value) is incremented from "0" to "8". The Wc0 and Wc1 signals shown in FIG. 8(I) are active when the count value takes "1"–"6". The Wd signal shown in FIG. 8(J) is active when the count value takes "7" or "8". The We signal shown in FIG. 8(K) is active when the count value takes "2"–"6". Also, the Wf signal shown in FIG. 8(M) is active when the count value takes "6" while the READY signal shown in FIG. 8(P) is active when the count value takes "8".

Meanwhile, according to a timing chart shown in FIG. 9, the Wb signal is incremented from "0" to "7" (FIG. 9(H)). The Wc0 and Wc1 signals are active when the count value is "1"–"5" (FIG. 9(I)). The Wd signal is active when the count value takes "6" or "7" (FIG. 9(J)). The We signal is active when the count value takes "2"–"5" (FIG. 9(K)). Also, the Wf signal is active in the count value takes "5" (FIG. 9(M)) while the READY signal is active when the count value takes "7" (FIG. 9(P)).

On the other hand, according to FIG. 10, the Wb signal is incremented from "0" to "6" (FIG. 10(H)). The Wc0 and Wc1 signals are active when the count value takes "1"–"4" (FIG. 10(I)). The Wd signal is active when the count value takes "5" or "6" (FIG. 10(J)). The We signal is active when the count value takes "2"–"4" (FIG. 10(K)). Also, the Wf signal is active when the count value takes "4" (FIG. 10(M)). The READY signal is active when the count value takes "6" (FIG. 10(P)).

In this manner, the periods that the Wb, Wc0, Wc1, Wd or We signals are active are reduced by one step (one count value) in each time. The timing that the Wf signal and the READY signals are active is made earlier by one step (one count value) in each time. The shortening of access time in the step S33 of FIG. 7 is concretely realized in this manner.

According to this embodiment, when reading data signals from the memory card 22 held in the slot 24, first the ADRS, CS and We signals in the maximum active periods are supplied to the controller, and an ID data signal is read from an ID storage address of the memory 22b. This ID data signal contains the data of a capacity value (total capacity value) of the memory. With this capacity value data, it is determined whether the memory capacity is greater than a predetermined value or not. If the capacity value is less than the predetermined value, the maximum active period is determined as an optimal active period. That is, the maximum active period is made effective.

On the other hand, if the capacity value is greater than the predetermined value, an ID data signal is read from the memory according to the ADRS, CS and We signals different in active period from one another. The read ID data signals are determined as to whether proper or not. Specifically, the common data contained in the ID data is compared to a predetermined value. If the common data in value shows a predetermined value, the ID data signal is determined proper. However, if the common data value does not show the predetermined value, the ID data signal is determined improper. The shortest active period among the active periods that the ID data signal determined proper has been read out is determined as an optimal active period. That is, the shortest active period that the ID data signal has been properly read out is made effective.

In this manner, if the memory capacity is less than the predetermined value, the maximum active period is made effective. If the memory capacity is greater than the predetermined value, the shortest active period that the data signal can be properly read out is made effective. Consequently, when the memory card having a capacity less than the predetermined value is inserted, it is possible to reduce the time required to access desired data. When a memory card having a capacity greater than the predetermined value is inserted, the controller can exhibit the function to a maximum.

Incidentally, in this embodiment, when determining a shortest active period for properly reading out an ID data signal, the active period is shortened by one step per time. However, the shortest active period may be determined by rather extending the active period by one step per time. Also, in this embodiment, the common data contained in the ID data signal is read out and the common data value is compared with a predetermined value, thereby determining as to whether the ID data signal is proper or not. However, the properness of the ID data signal may be determined by the capacity value data read out prior to the common data. In this case, the capacity value data read out with the maximum access time may be held in a register so that various ones of capacity value data read out with different ones of access time are compared with the capacity value data in the register.

Furthermore, although foregoing to embodiments use the compact flash (produced by Sun Disk), a memory stick (produced by Sony) may be used instead of the compact flash. In place of the semiconductor memory, such as a compact flash or memory stick, a disk recording medium, such as a micro-drive (produced by IBM) may be employed. Furthermore, although in the two embodiments the control signals Wc0, Wc1, Wd, We, Wf and READY signals were controlled in output timing by the counter, a state machine other than the counter may be used in controlling the timing. Also, although explanation was only on the reading operation in the two embodiments, this invention is also effective for write operation.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A memory access circuit comprising:
   a holder for holding a removable recording medium having a memory and a controller to access said memory in response to an access control signal;
   an outputter for outputting the access control signal to said controller;
   a detector for detecting a capacity value of said memory;
   a first setter for setting an active period for the access control signal to a first period when the capacity value is below a predetermined threshold; and
   a second setter for setting an active period for the access control signal to a second period shorter than the first period when the capacity value is greater than the predetermined threshold.

2. A memory access circuit according to claim 1, wherein said memory stores capacity value data, and said detector detecting the capacity value by reading the capacity value data from said memory according to the access control signal.

3. A memory access circuit according to claim 1, wherein the access control signal contains an enable signal, the enable signal having an active period set to either one of the first period or the second period.

* * * * *